United States Patent
Ueyoko et al.

(10) Patent No.: US 7,172,002 B2
(45) Date of Patent: Feb. 6, 2007

(54) PNEUMATIC TIRE WITH SPECIFIED INNER LINER

(75) Inventors: Kiyoshi Ueyoko, Kobe (JP); Minoru Nishi, Kobe (JP); Kazuki Numata, Kobe (JP)

(73) Assignee: Sumitomo Rubber Industries, ltd., Kobe (JP)

( * ) Notice: Subject to any disclaimer, the term of this patent is extended or adjusted under 35 U.S.C. 154(b) by 0 days.

(21) Appl. No.: 10/250,365

(22) PCT Filed: Jan. 11, 2002

(86) PCT No.: PCT/JP02/00120

§ 371 (c)(1),
(2), (4) Date: Dec. 23, 2003

(87) PCT Pub. No.: WO02/055323

PCT Pub. Date: Jul. 18, 2002

(65) Prior Publication Data
US 2004/0123927 A1    Jul. 1, 2004

(30) Foreign Application Priority Data

| Jan. 11, 2001 | (JP) | ............................. 2001-003931 |
| Feb. 20, 2001 | (JP) | ............................. 2001-043761 |
| Mar. 26, 2001 | (JP) | ............................. 2001-088169 |

(51) Int. Cl.
  B60C 15/06  (2006.01)
  B60C 15/04  (2006.01)
  B60C 15/00  (2006.01)
  B60C 5/14   (2006.01)

(52) U.S. Cl. ...................... 152/510; 152/540; 152/543; 152/547; 152/552

(58) Field of Classification Search ................ 152/510, 152/543, 547, 552, 540
See application file for complete search history.

(56) References Cited

U.S. PATENT DOCUMENTS 6,408,914 B1 *  6/2002  Lamock et al. ............. 152/543

FOREIGN PATENT DOCUMENTS

| AU | 47002/85 B | 3/1986 |
| EP | 958946 A2 | 11/1999 |
| EP | 997325 A1 | 5/2000 |
| EP | 0 997 325 B1 | 8/2003 |
| JP | 63-082802 A | 4/1988 |
| JP | 64-036509 A | 2/1989 |

(Continued)

Primary Examiner—Adrienne C. Johnstone
(74) Attorney, Agent, or Firm—Birch, Stewart, Kolasch & Birch, LLP

(57) ABSTRACT

A pneumatic tire comprises a tread portion, a pair of sidewall portions, a pair of bead portions, a bead core disposed in each bead portion, a carcass comprising a ply of carcass cords extending between the bead portions through the tread portion and sidewall portions and turned up around the bead core in each bead portion, and an inner liner made of air-impermeable rubber extending on the tire cavity side of the carcass from one of the bead portions to the other. The radially inner end of the inner liner is located radially inside the radially innermost end of the carcass. In a radial region between the radially innermost end of the carcass and the radially outermost end of the bead core, the thickness of the inner liner is not less than 0.15 time but not more than 4.0 times the cross section diameter of the carcass cord.

9 Claims, 10 Drawing Sheets

FOREIGN PATENT DOCUMENTS

| | | |
|---|---|---|
| JP | 5-050807 A | 3/1993 |
| JP | 2731104 B2 | 12/1997 |
| JP | 2740624 B2 | 1/1998 |
| JP | 10-297209 A | 11/1998 |
| JP | 11-321244 A | 11/1999 |
| JP | 2000-142039 A | 5/2000 |
| JP | 2000-335209 A | 12/2000 |

* cited by examiner

PNEUMATIC TIRE WITH SPECIFIED INNER LINER

This application is the national phase under 35 U.S.C. Ø 371 of PCT International Application No. PCT/JP02/00120 which has an International filing date of Jan. 11, 2002, which designated the United States of America.

TECHNICAL FIELD

The present invention relates to a pneumatic tire, more particularly to a structure of the bead portion being capable of improving the durability performance.

BACKGROUND ART

In general, an annular bead core, which is disposed in each bead portion of a pneumatic tire to provide a hoop effect, is made of windings of a metal wire wound at a predetermined number of time, and it has a function to secure the carcass ply by turning up the carcass ply around the bead core from the axially inside to the outside of the tire.

On the other hand, the inner surface of a tire is provided with an inner liner of air-impermeable rubber extending over the tread portion, sidewall portions and bead portions in order to maintain an air pressure. Conventionally, the radially inner end of the inner liner is terminated near the bead cores, and usually, in a region axially inside the bead core the axially inside of the bead portion is not completely covered with the inner liner. This is because of the idea that, as the bead portion is thick and its area is small for the tire as a whole, the amount of leaked air is very small and there is no substantial influence upon keeping of the air pressure.

In a heavy duty pneumatic tire for trucks and buses which is used under severe conditions at high tire pressure and heavy loads, especially which has steel cords as the carcass cords and/or a bead reinforcing layer, even if there is no substantial problem of air leakage, if small amount of air or moisture penetrates into the bead portion and reaches to the surface of such a cord on which a small separation or adhesion failure occurs, the cord will be eroded. If the cords are steel cords, the rust may be caused. If the cord is made of organic fibers, the strength may be decreased as they absorb water, and as the result, there is occasionally seen a cord damage and a separation of the cords from the topping rubber. Usually, this does not expand into the deterioration of the bead durability in the case of the light-load tires. However, in the case of heavy-duty tires, as the deformation of the bead portions and the shearing force between cords and rubber are large, sometimes the durability of bead portions is impaired.

It is therefore, an object of the present invention to provide a pneumatic tire in which the damages of the bead portions caused by the cord damage and the separation between cords and rubber is prevented, and the durability of the bead portions is improved.

DISCLOSURE OF THE INVENTION

According to the present invention, a pneumatic tire comprises: a tread portion; a pair of sidewall portions; a pair of bead portions; a bead core disposed in each of the bead portions; a carcass comprising a carcass ply made of carcass cords extending between the bead portions through the tread portion and sidewall portions and turned up around the bead core in each of the bead portions; and an inner liner made of air impermeable rubber and extending on the tire cavity side of the carcass from one bead portion to the other, wherein the above-mentioned inner liner has radially inner ends located radially inside the radially innermost end of the carcass, and in a radial region between the radially innermost end of the carcass and the radially outermost ends of the bead core, the thickness of the inner liner is not less than 0.15 times but not more than 4.0 times the cross section diameter of the carcass cord.

BEST MODE FOR CARRYING OUT THE INVENTION

Figure 1A:
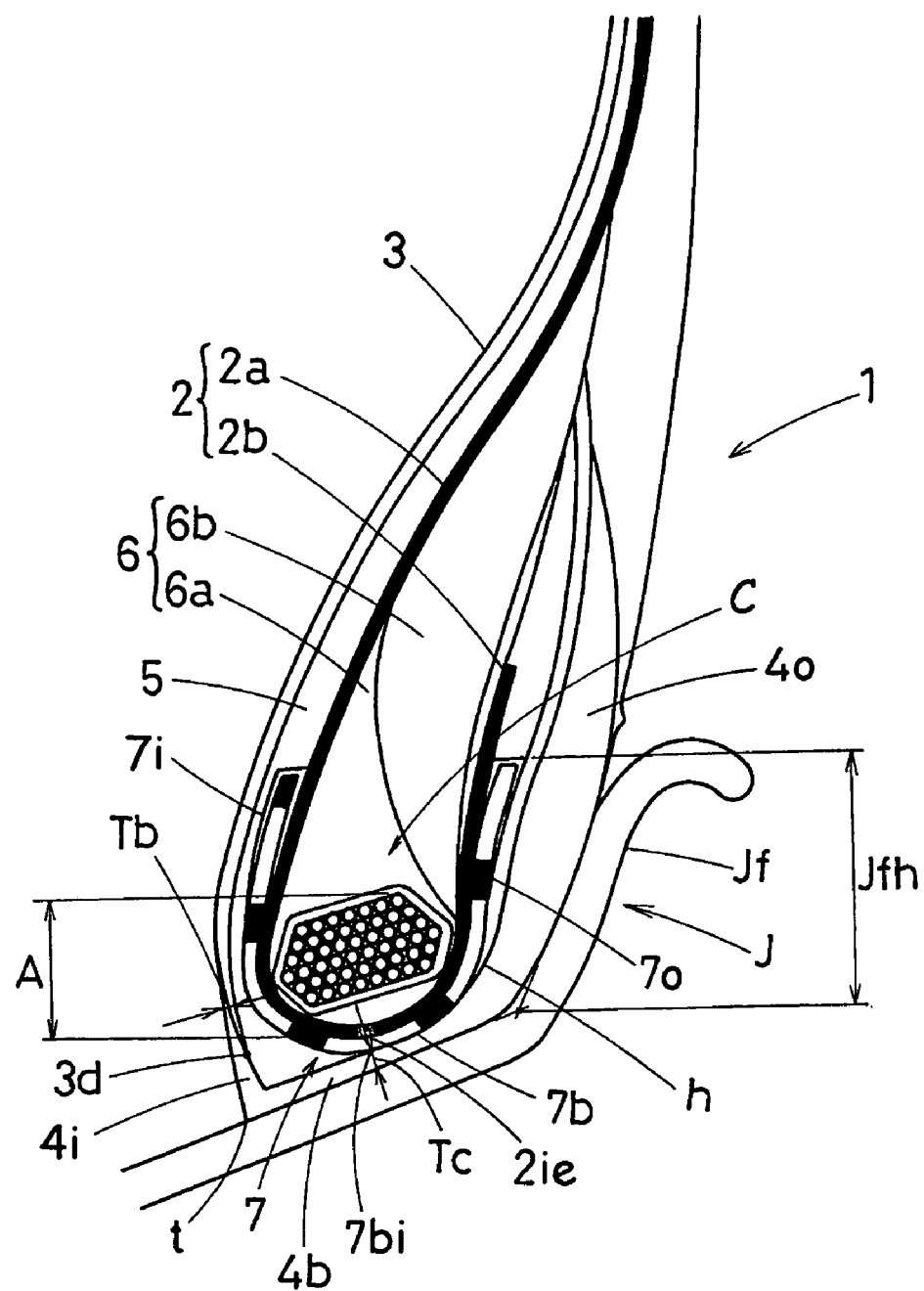
FIG. 1A is a cross sectional view showing a bead portion of a pneumatic tire, as a 1st embodiment of the present invention, in a state that the tire is mounted on a regular rim and inflated to a regular pressure.

Taking a case, as an example, where the pneumatic tire of the present invention is a heavy duty tubeless radial tire for trucks, buses and heavy-duty vehicles of the similar type, embodiments of the present invention will now be described in detail in conjunction with the accompanying drawings.

The pneumatic tire has a tread portion, a pair of sidewall portions and a pair of bead portions 1 which continue in a troidal shape. The tire comprises a carcass 2 extending between the bead portions through the tread portion the sidewall portions; an inner liner 3 disposed inside the carcass 2; and a bead core C, bead apex 6 and chafer 4 which are disposed in each of the bead portions 1.

The tire is mounted on a standard rim J, that is, a 15-degree-taper drop center rim for heavy-duty tire.

Here, the standard rim is a rim specified in the standard with which the tire is required to comply, such as JATMA (Japan and Asia), T&RA (North America), ETRTO (Europe), STRO (Scandinavia), etc. For example, the standard rim is the "standard rim" in JATMA, "Design Rim" in TRA, "Measuring Rim" in ETRTO. Similarly, the undermentioned standard pressure means the maximum air pressure in JATMA, the maximum pressure given in the "TIRE LOAD LIMITS AT VARIOUS COLD INFLATION PRESSURES" table in TRA, the "INFLATION PRESSURE" in ETRTO, etc.

In this specification, for the sake of simplification, the "axial direction of the tire" and "radial direction of the tire" may be referred to as the "axial direction" and "radial direction". Further, the words "upper" and "lower" may be used to describe a positional relationship "outside or inside" in the radial direction of the tire. Furthermore, the words "inner" and "outer" may be used to describe a positional relationship "inside or outside" in the axial direction of the tire on each side of the tire equator.

The carcass 2 comprises at least one ply of carcass cords which are arranged radially so that the cord angle becomes 70 to 90 degrees with respect to the tire equator. The carcass ply extends between the bead portions through the tread portion and sidewall portions and is turned up around the bead core C in each bead portion 1 to be secured to the bead core c, forming a pair of ply-turnup portion 2b and a ply-main portion 2a therebetween. In the carcass ply, metal cords such as steel cords and organic cords such as polyester, aromatic polyamide, nylon, rayon etc., may be used as the cords thereof. In each of the following embodiments, the carcass 2 is composed of a single-ply of steel cords whose cord angle is substantially 90 degrees with respect to the tire equator.

The inner liner 3 is made of air-impermeable rubber disposed along the inner surface of the tire so as to cover the entirety thereof.

As to the air impermeable rubber, when all the rubber content excluding additives and the like is regarded as 100 parts by weights, one containing at least 60 parts by weights of butyl rubber, for instance halogenated butyl rubber, brominated butyl rubber, butyl rubber, is preferably used. If butyl rubber is less than 60 parts by weights, the air-impermeability falls, which is not desirable. For example, in order to improve the cure rate, rubber polymers made of the following brominated butyl rubber may be used:

|  | (phr) |
| --- | --- |
| Br-IIR 2255 | 100 |
| N660 | 65 |
| R500 | 65 |
| Stearic acid | 1.2 |
| Zinc oxide | 3 |
| Sulfur | 0.5 |
| Accelerator | 1.5 |

In the case where the inner liner 3 contains butyl rubber at a relatively high rate, especially where the carcass cord is made of steel, if the inner liner 3 directly contacts with the topping rubber for the steel cords, a separation is liable to occur along the boundary face. Therefore, it is preferable that an insulation 5 made of an adhesion-improving rubber compound containing natural rubber or isoprene rubber as its main component is disposed between the inner liner 3 and the carcass 2 so as to cover all over the outer surface of the inner liner 3. An example of such adhesion-improving rubber compound is shown below.

|  | (phr) |
| --- | --- |
| Natural rubber | 80 |
| IR | 20 |
| N326 | 60 |
| Antidegradant | 2 |
| Zinc oxide | 3 |
| Sulfur | 1 |
| Accelerator | 1 |

The chafer 4 is made of a rubber whose 100% modulus (M100) is 440 to 830 N/sq.cm, and is disposed along at least the bottom and axially outer surface of the bead portion 1, forming a surface contacting with the bead seat and flange of the wheel rim J. If the 100% modulus is less than 440 N/sq.cm, a rubber rupture tends to occur. If the 100% modulus exceeds 830 N/sq.cm, the rubber becomes too hard and problems regarding processing tend to occur. Moreover, the rubber becomes more rigid with the use of tire, leading to a loss of elasticity, an increased fragility against deformation and an increased heat generation, and a separation from other members tends to occur.

The bead core C is formed by winding a single steel wire spirally to have a specific cross-sectional shape. In each of the following embodiments, the bead core C is a layered structure made up of layers of the spirally wound steel wire and having a hexagonal cross-sectional shape. The bead core comprises lower layers of which numbers of windings increase one by one from the radially inside to the radially outside up to the maximum width layer, and upper layers of which numbers of windings decrease one by one from the radially inside to the radially outside. The spirally wound steel wire is wrapped in a wrapping protection layer wound therearound and comprising organic fiber cords so as to retain the above-mentioned cross-sectional shape and to prevent the direct contact of the carcass cords with the steel wire.

First Embodiment

Figure 1B:
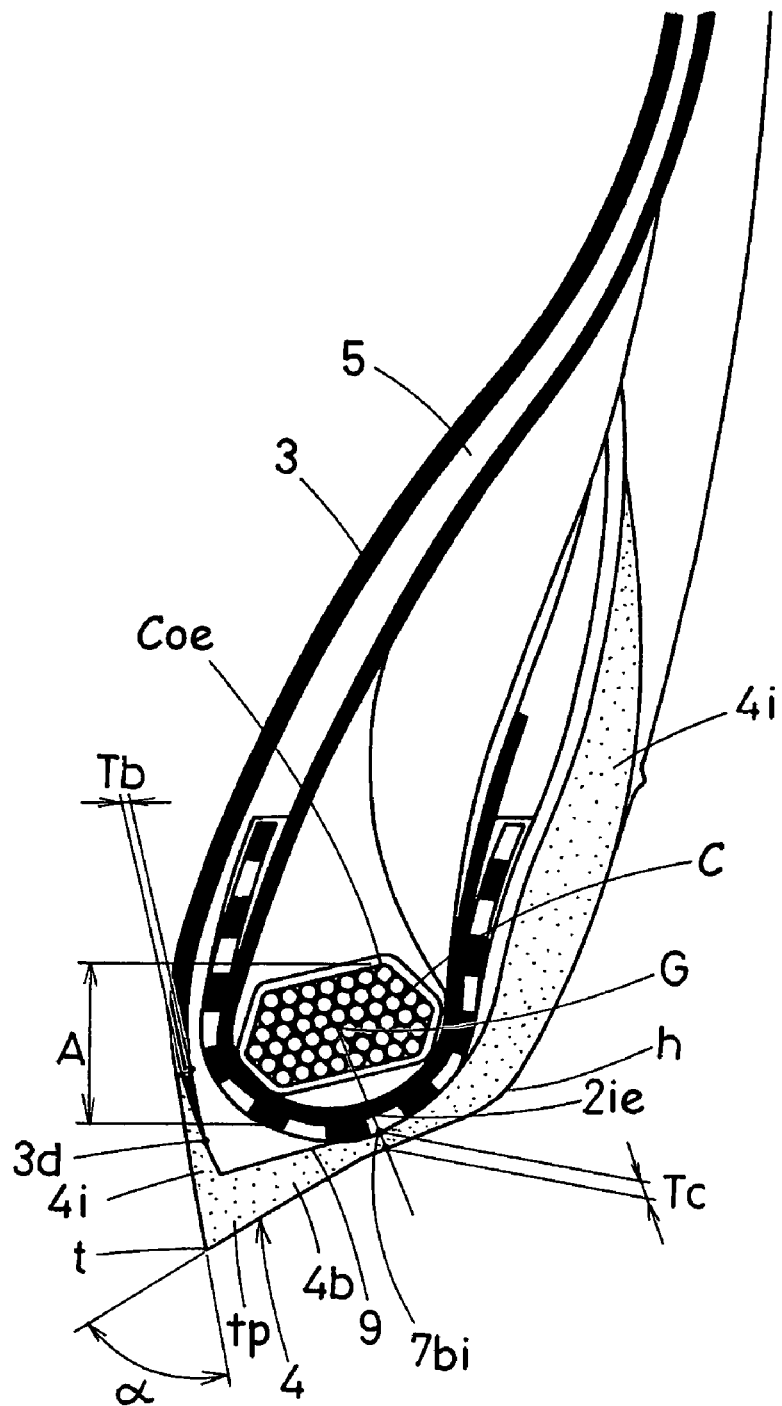
FIG. 1B is a cross sectional view showing the same bead portion in a free state not mounted on a rim.

FIGS. 1A and 1B show a first embodiment of the present invention, wherein FIG. 1A shows a meridian section of the bead portion 1 in a state of the pneumatic tire which is mounted on a standard rim J and inflated to a standard inner pressure but loaded with no tire load (hereinafter the "standard state"), and FIG. 1B shows the meridian section of the bead portion 1 in a free state of the tire which is not mounted on a rim.

The bead portions 1A are each provided between the ply-main portion 2a and ply-turnup portion 2b of the carcass 2 with the bead apex 6 extending radially outwards from the upper surface of the bead core C. The bead apex 6 in this example includes an inner apex 6a disposed adjacent to the bead core and made of a hard rubber, and an outer apex 6b disposed radially outside thereof and being softer than the inner apex.

The above-mentioned ply-turnup portion 2b is extended radially outwardly along the axially outer surface of the bead apex 6, and terminated in a position radially inside the upper end of the bead apex 6.

The bead portions 1 are each provided along the carcass 2 with a reinforcing layer 7. The reinforcing layer 7 in this example is made up of a base portion 7b along the bottom surface of a part of the carcass 2 beneath the bead core, an axially inner portion 7i extending radially outwardly from the base portion 7b along the carcass-ply main portion 2a, and an axially outer portion 7o extending radially outwardly from the base portion 7b along the carcass-ply turnup portion 2b, so the reinforcing layer has a u-shaped cross-sectional shape. Each of the axially inner portion 7i and axially outer portion 7o extends to a height of 0.8 to 2.5 times the height of a flange Ff of the rim. The reinforcing layer 7 in this example is made up of a single rubberized ply of parallel steel cords. AS to the cord angle thereof, when the tire is viewed sideways facing the sidewall portion normally thereto, the cords in the axially inner portion 7i and axially outer portion 7o are inclined at an angle of 30 to 60 degrees with respect to a radially outward line. Further, the above-mentioned carcass ply's turnup portion 2b and reinforcing layer 7's ply are provided at their upper ends with various kinds of buffer rubber layers for reducing stress between each of the plies and the above-mentioned rubber layers.

The inner liner 3 continuously extends from one of the bead portions 1 to the other through the tread portion and the sidewall portions. In each of the bead portions, the radially inner end 3d thereof is located at a position radially outside a bead toe (t) but radially inside the radially innermost end 2ie of the carcass 2.

Given that, under the above-mentioned standard state, a tire radial region (A) is defined between the radially outermost end Coe of the bead core C and the radially innermost end 2ie of the carcass 2, the inner liner 3 extends into this region (A) on the axially inside of the bead core C. In the region (A), in view of the prevention of adhesion failure, etc., the thickness Tb of the inner liner 3 is preferably set to be 0.15 to 4.0 times the cross section diameter D of the carcass cord. If less than 0.15 times, the permeation of air and moisture becomes increased or the impermeability deteriorates. If exceeds 4.0 times, no improvement is observed in the effect and such increase simply leads to an increased tire cost. In the region (A), in this example, the thickness Tb of the inner liner 3 gradually decreases toward the radially inside. A minimum value of the thickness Tb at the radially inner end of the region (A) is not less than 0.15 times the cross section diameter D of the carcass cord as described above, but more preferably, not less than 0.3 times but not more than 1.8 times the diameter.

Here, the cross section diameter D of the carcass cord means the diameter of a circle circumscribing the elemental filaments constituting a cord, except a wrapping wire, if any.

The chafer 4 in this example is made up of a base portion 4b extending from the bead toe (t) to the bead heel (h) along the bottom surface of the bead portion 1, an axially inner portion 4i extending from the bead toe (t) toward the radially outside along the inner surface of the tire, and an axially outer portion 4o extending from the bead heel (h) toward the radially outside along the outer surface of the tire. The axially inner portion 4i in this example is extended into the above-mentioned region (A) and terminated at a point therein, covering the inner surface of the radially inner end portion of the inner liner 3.

The insulation 5 in this example is disposed between the inner liner 3 and carcass 2 and between the inner liner 3 and reinforcing layer 7, and extends radially inwardly beyond the radially inner end 3d of the inner liner 3 to the vicinity of the bead toe (t), abutting on the chafer 4. Further, it extends axially outwardly, abutting on the chafer 4, and terminates substantially beneath the centroid of the cross-sectional shape of the bead core.

As shown in FIG. 1B, on the bottom surface of the bead portion 1 which is defined by the chafer 4, there is formed a protrusion tp by making the inclination angle with respect to the tire axial direction larger in a portion ranging from a position substantially beneath the centroid G of the bead core to the bead toe (t) than in the remaining portion.

In the meridian section of the tire under the above-mentioned free state, an intersecting angle α between the bottom surface of the bead portion and the tire inner surface at the bead toe (t) is set to be not less than 38 degrees but not more than 90 degrees. The reason for setting up like this is that, due to the above-described properties of the chafer 4, if the angle α is smaller than 38 degrees, then the strength around the bead toe (t) will decrease, leading to a generation of rubber chip and crack at the time of rim mounting. If the angle α is larger than 90 degrees, the tire production will become difficult.

Although the limitation of the intersecting angle α is made in order to be applied suitably to this embodiment, it is preferably applied as well to every embodiment explained hereinafter.

The minimum rubber thickness Tc of the chafer 4 is set in the range of not less than 1.7 times but not more than 6.0 times, preferably 2.6 to 4.5 times the cross section diameter D of the carcass cord, wherein the minimum rubber thickness is defined as the minimum distance from the bottom surface of the bead portion to the adjacent cords (the carcass cords if there is no reinforcing cord layer between the bottom surface and the carcass such as the above-mentioned reinforcing layer 7 OR the cords of such reinforcing cord layer if there is). By setting the minimum rubber thickness Tc within this range, there may be prevented the adhesive failure between the cords and rubber resulting from the large shearing stress and compressive stress under the bead core repeatedly given during running. When the minimum rubber thickness Tc is less than 1.7 times the cross section diameter D, the chafer 4 may be ruptured easily, and when ruptured, the cord will contact with the rim, which is not preferable. When the minimum rubber thickness Tc is more than 6.0 times the cross section diameter D, the hoopping force of the bead core is decreased, and at the same time, the heat buildup from the rubber increases, leading to a possibility of the adhesive failure by heat.

Although the limitation of the minimum rubber thickness Tc is made in order to be applied suitably to this embodiment, it may be preferably applied as well to each embodiment explained hereinafter.

It is desirable to avoid extending the above-mentioned insulation 5 into a position at which the minimum rubber thickness Tc occurs if it has a substantial thickness thereat. The bottom surface of the insulation 5 is substantially parallel with the bead bottom surface, and terminated near the radially innermost end 7bi of the base portion 7b of the reinforcing layer 7 (which end 7bi is in line with the innermost end 2ie of the carcass 2), whereby the insulation 5 covers an axially inner portion of the base portion 7b and the inner portion 7i of the reinforcing layer.

Second Embodiment

Figure 2:
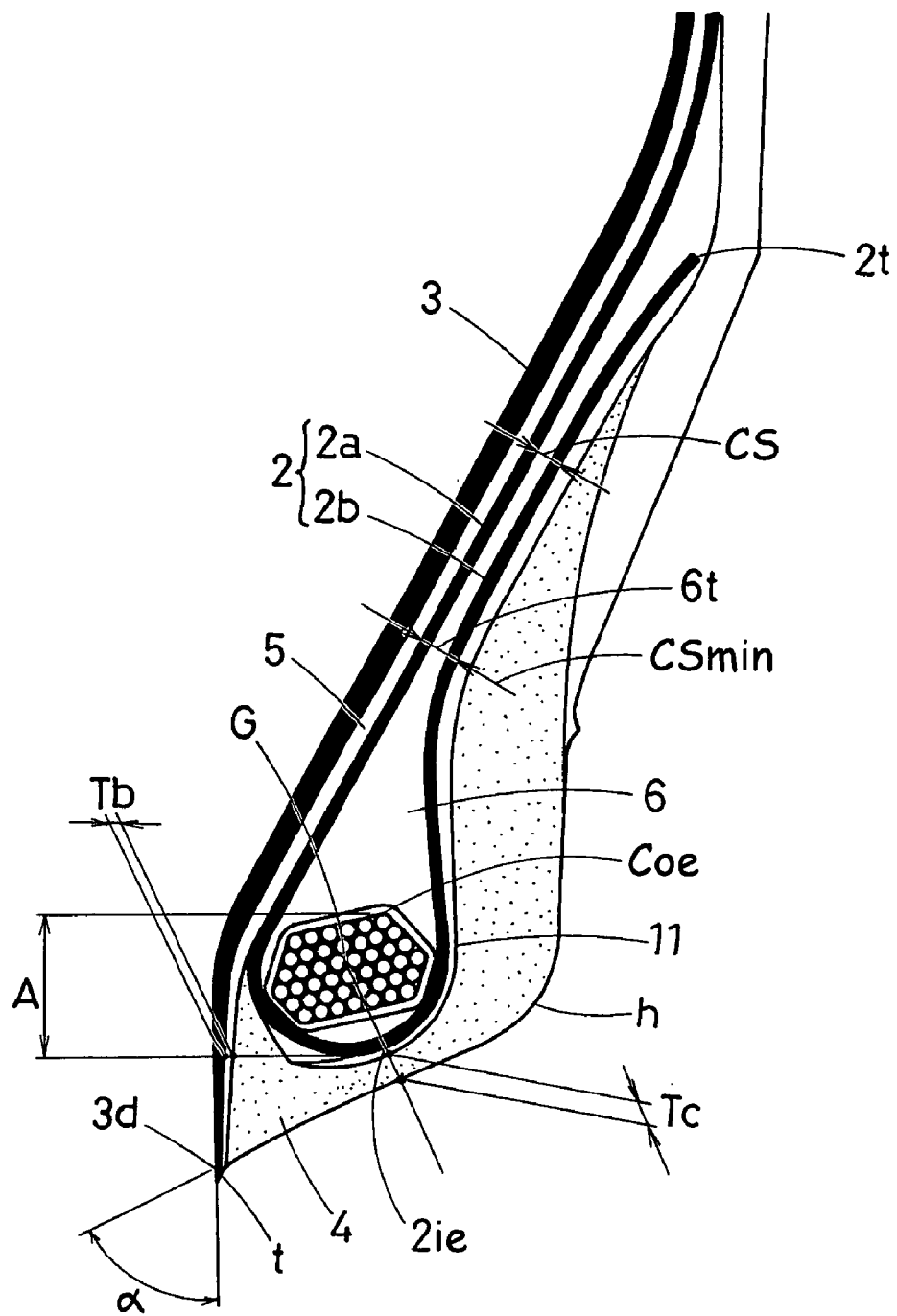
FIGS. 2–9 are cross sectional views showing bead portions of pneumatic tires as 2nd–9th embodiments of the present invention.

FIG. 2 shows a second embodiment of the present invention.

The bead apex 6 is smaller in volume and size in comparison with the above-mentioned first embodiment, and made up of an equivalent to the above-mentioned inner apex 6a alone.

The turnup portion 2b of the carcass ply extends along the axial outer surface of the bead apex 6, radially outwardly beyond the upper end 6t of the bead apex 6. Between the carcass cords in this portion beyond the upper end 6t and the carcass cords in the carcass-ply main portion 2a, a specific cord distance CS is provided.

The cord distance CS in this example increases from the upper end 6t of the bead apex toward the upper end 2t of the turnup-portion 2b. AS to the region from the upper end 6t to the upper end 2t, in its 1/3 to 2/3 part from the upper end 6t, the cord distance CS is substantially constant, but in the remainder or radially outer part, the cord distance gradually increases. However, it may be also possible that the cord distance CS is substantially constant all over the region or that the cord distance CS is gradually increased across the entire region. When increasing the cord distance CS gradually, a relatively small increasing rate such that the angle between the carcass-ply main-portion 2a and the turned-up-portion 2b becomes about 1 to about 5 degrees in the meridian section, is preferred. The minimum cord distance CSmin is set in a range of from 0.15 to 7.0 times, preferably about 1.2 to about 4.0 times the carcass cord diameter D.

The inner liner 3 in this example is extended to the bead toe (t) and terminated there. Accordingly, the tire inner surface is completely covered with the inner liner 3. As to the thickness Tb of the inner liner 3 in the above-mentioned region (A), the numerical limitation explained therefor in the first embodiment may be again applied to this embodiment.

The insulation 5 extends to the bead toe (t), abutting on the inner liner 3, to prevent the contact of the inner liner 3 with the carcass and chafer 4. In this embodiment, the above-mentioned reinforcing layer 7 is not disposed.

The chafer 4 extends from the bead toe (t) to a point in the above-mentioned region (A), along the axially outside of the insulation 5.

Third Embodiment

Figure 3:
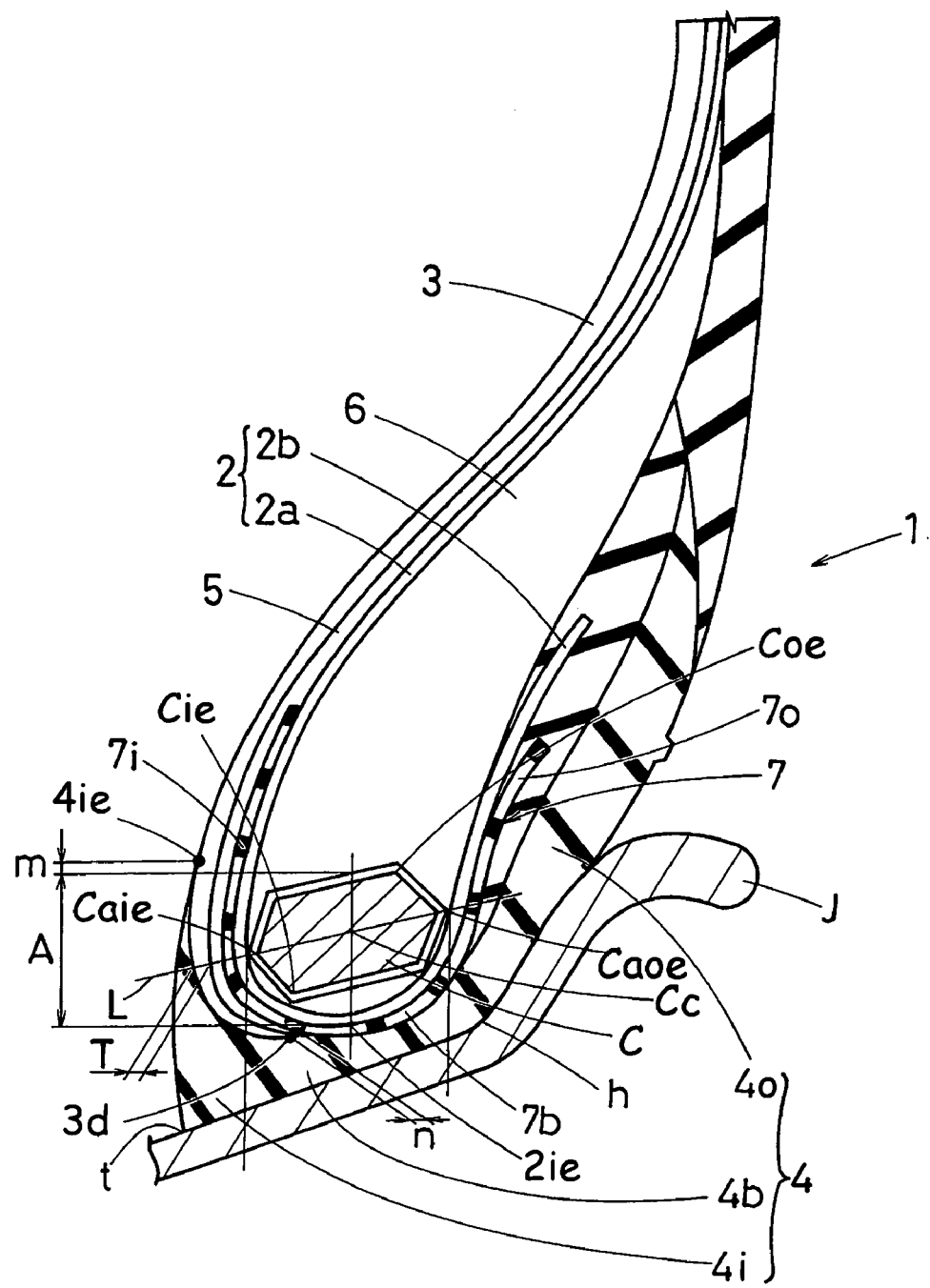

FIG. 3 shows a third embodiment of the present invention.

In the bead portion 1, the reinforcing layer 7 having a u-shaped cross-sectional shape same as in the first embodiment is disposed along the carcass 2. The axially inner portion 7i and outer portion 7o of the reinforcing layer 7 are each extended radially outwards of the radially outermost point Coe of the bead core C up to, for example, a height corresponding to the point Coe to which a height of about 0.5 to 2.0 times that of the region (A) is added. Thus, while the carcass 2 is protected, the bending rigidity of the whole bead portion increases, a deformation of the bead portion when loaded is controlled, and strain of each part decreases. As the result, the bead durability of the tire may be improved. The reinforcing layer 7 in this embodiment is made up of a single rubberized ply of parallel steel cords. As to the cord angle thereof, when the tire is viewed sideways facing the sidewall portion normally thereto, the cords in the axially inner portion 7i and axially outer portion 7o are inclined at an angle of from 15 to 45 degrees with respect to a radially outward line.

The inner liner 3 in this embodiment extends along the carcass 2 and reinforcing layer 7, beyond the above-mentioned region (A) radially inwardly to be wound upon the radially inside of the bead core C. The axial position of the inner end 3d of the inner liner 3 is set between the axial position of the axially innermost point Caie of the bead core C and the axial position of the middle point Cc between the above-mentioned axial innermost point Caie and axial outermost point Caoe of the bead core C. The thickness T of the inner liner 3 measured along a straight line L passing through the innermost point Caie and outermost point Caoe is set in a range of from 0.5 to 2.0 mm. If the thickness is less than 0.5 mm, the permeating of air and moisture may not be prevented enough, and a thickness over 2.0 mm is superfluous.

The insulation 5 in this embodiment is, similarly to the inner liner 3, extended along the carcass 2 and wound toward the radially inside of the bead core C so as to terminate at a position slightly beyond the inner end 3d of the inner liner 3. At a position radially inside the radially innermost point Cie of the bead core C, the thickness (n) of the insulation 5 is set in a range of from 1 to 1.5 mm. If less than 1 mm, cracks tend to occur on the bead base.

As the inner liner 3 is wound upon the under side of the bead core, while increasing its thickness from a position under the bead core, the chafer 4 extends axially inwardly to the bead toe (t) along the axially inner surface of the inner liner 3, and then extends radially outwardly to a position whose radial height is in a range between the radial height of the radially outermost point Coe of the bead core C plus 5 mm and the same radial height minus 5 mm. If outside this plus/minus 5 mm range, the bead durability will decrease.

Fourth Embodiment

Figure 4:
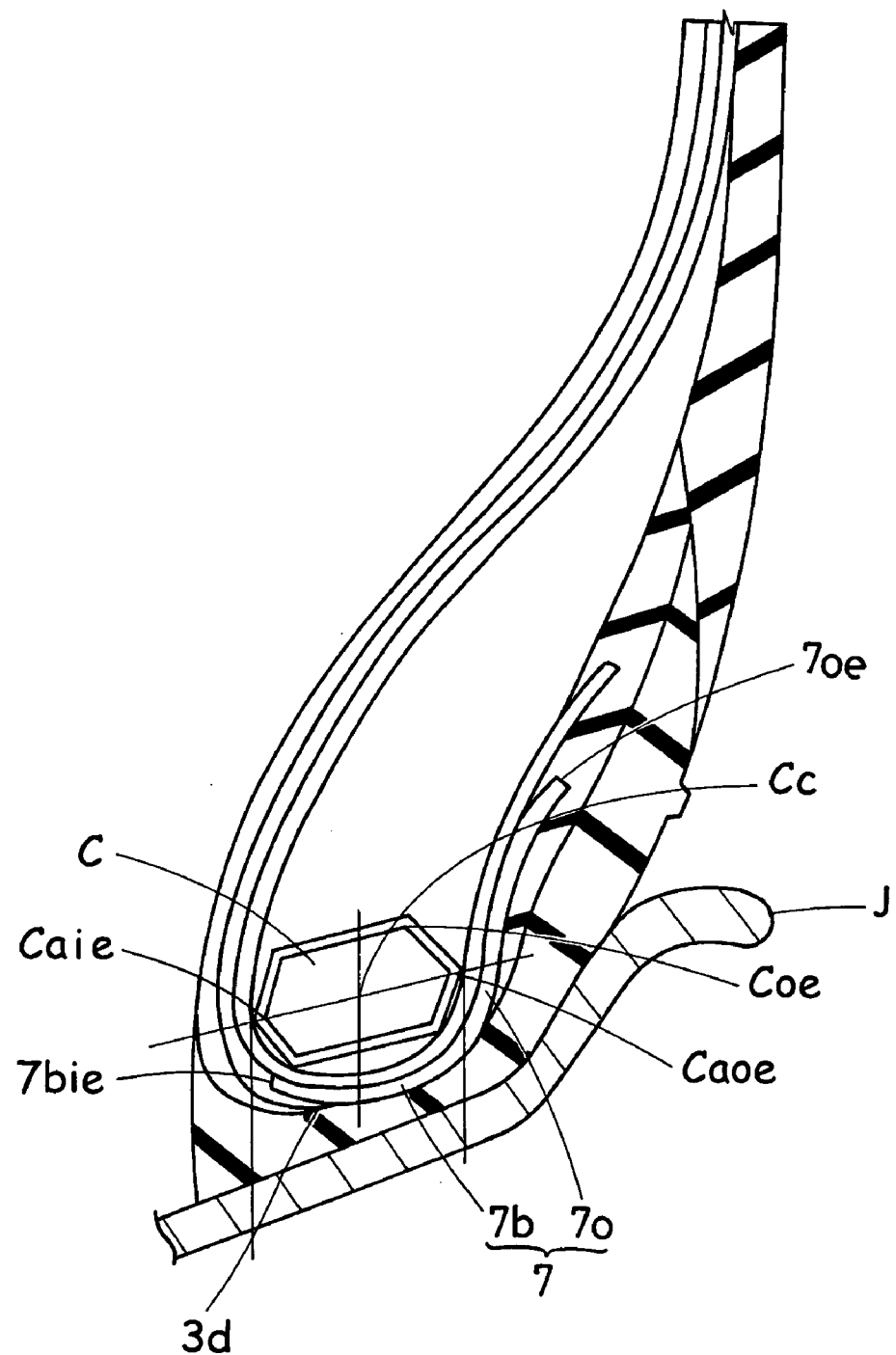

FIG. 4 shows a fourth embodiment of the present invention which is the same as the third embodiment except for the reinforcing layer 7.

The reinforcing layer 7 comprises the base part 7b under the bead core and the axially outer portion 7o in the same way as the above-described embodiments, but the axially inner portion 7i is eliminated for the purpose of weight reduction. The axially inner end 7bie of the base part 7b is located between a radial line passing through the axially innermost point Caie of the bead core C and a radial line passing through the axially outermost point Caoe of the bead core. Further, the radially inner end of the insulation 5 and the radially inner end 3d of the inner liner 3 are located axially outwards of the inner end 7bie of the base portion 7b, but axially inwards of a radial line passing through the above-mentioned middle point Cc of the bead core C.

Fifth Embodiment

Figure 5:
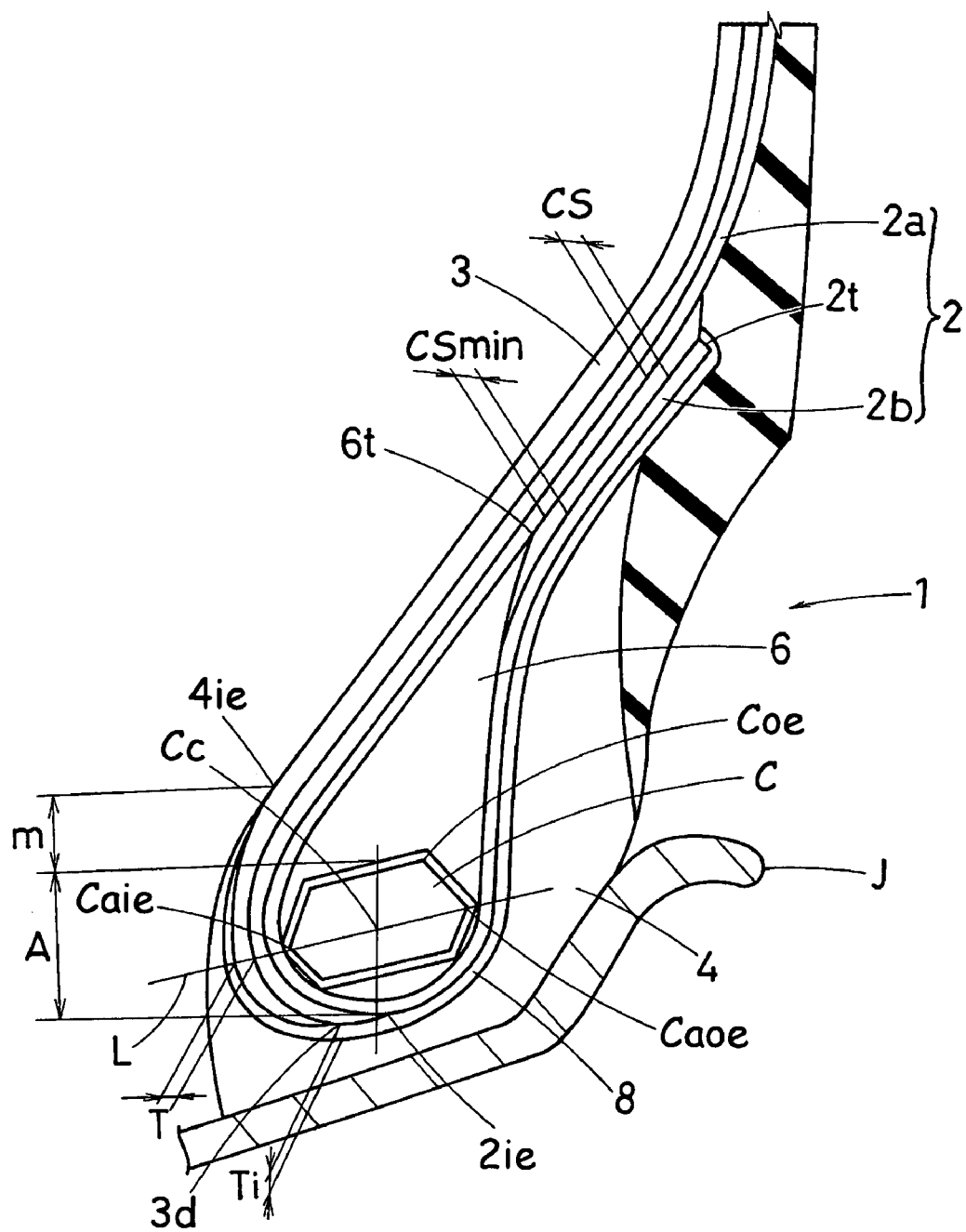

FIG. 5 shows a fifth embodiment of the present invention, wherein, for the purpose of weight reduction, the bead apex 6 is made in a smaller volume and size like the above-explained second embodiment, and the reinforcing layer 7 is eliminated.

As for the bead apex 6 and the carcass ply, in particular the turnup portion 2b, the above descriptions of those in the second embodiment can be applied here again. In this embodiment, a part of the turnup portion 2b of the carcass ply which part extends beyond the upper end 6t of the bead apex 6, is substantially straight and substantially in parallel with the carcass-ply main portion 2a.

The inner liner 3 and insulation 5 are extend along the carcass 2 and wound toward the radially inside of the bead core C in the same way as in the fourth embodiment, and the radially inner ends thereof are located at positions radially inwardly beyond the above-mentioned region (A).

With respect to the axial position, the inner end 3d of the inner liner 3 is located between the axially innermost point Caie and the middle point Cc of the bead core C in the same way as in the third embodiment. Measured along a straight line L passing through the innermost point Caie and outermost point Caoe of the bead core C, the thickness T of the inner liner 3 is set in a range of from 0.5 to 2.0 mm. The radially inner end of the insulation 5 is located in a position slightly axially outwardly beyond the inner end 3d of the inner liner, in this example specifically, a position axially outside the above-mentioned middle point Cc, at the radially innermost end 2ie of the carcass.

As for the chafer 4, the description of that in the third embodiment can be applied.

When the reinforcing layer 7 which increases the rigidity of the bead portion 1 is not provided, a separation between the chafer 4 and inner liner 3 tends to occur on the radially inside of the bead core C. In order to prevent this, an insulation 8 is disposed between the inner liner 3 and the chafer 4, too.

This second insulation 8 is made of a rubber compound comprising polymers mainly of natural rubber and/or isoprene rubber for improving the adhesive property, and a relatively high carbon for providing strength. Further, it comprises organic-acid cobalt since the second insulation contacts with the carcass ply comprising steel cords. Examples of such rubber compound is shown below. These rubber compounds correspond to compositions (a) and (b) used in the undermentioned comparison test 2.

| Composition | (a) | (b) |
| --- | --- | --- |
| Natural rubber | 80 | 80 |
| IR | 20 | 20 |
| N219 | 65 | 60 |
| Antidegradant | 2 | 2 |
| Zinc oxide | 9.5 | 7.5 |
| Stearic acid cobalt | 1.5 | 0.7 |
| Sulfur | 4.5 | 4.5 |
| Accelerator | 1 | 1 |

(Unit: phr)

The second insulation 8 extends at least from a point axially inside the bead core C to a point radially inside the bead core C, in order to isolate the inner surface of the inner liner 3 from the chafer 4. The insulation 8 in this example extends beyond the upper end 2t of the turnup portion 2b from in a region radially inside the bead core C so as to cover the whole of the axially outer surface of the carcass turnup portion 2b. Then it extends along the axially inner surface of the inner liner 3, radially outwardly beyond the region (A), and it is terminated near to and slightly radially inside the radially outer end 4ie of the axially inner portion 4i of the chafer 4. The distance (m) of this terminating point from the radially outer edge 4ie is set to be not more than 15 mm, preferably not more than about 8 mm. Consequently, in the region (A), a four-layered structure of the insulation 5, inner liner 3, second insulation 8 and chafer 4, is formed on the axially inside of the carcass 2. It is preferable for the second insulation 8 that its thickness Ti at the inner end 3d of the inner liner is in a range of from 1 to 1.5 mm. If less than 1 mm, the above-mentioned separation between the inner liner 3 and chafer 4 may not be prevented enough. If more than 1.5 mm, it becomes difficult to ensure the necessary minimum thickness of the chafer 4.

Sixth-Ninth Embodiments

FIG. 6–FIG. 9 show 6th–9th embodiments of the present invention, wherein the carcass ply is secured by winding the turnup portion 2b substantially once around the bead core C.

In order to make it easy to wind the carcass ply of high-rigidity steel cords, the bead core C is formed by spirally winding a single steel wire into a cross-sectional shape which is a transformed hexagon approximate to an inverse triangle whose maximum width position is radially outward of the center of the height of bead core C.

In each of the following embodiments, the bead core is provided with a five-layered structure made up of lower layers which are the first, second and third layers whose numbers of windings are 4, 5 and 6, respectively, a maximum-width layer whose number of windings is 7, and an upper layer which is the fifth layer whose number of windings is 6.

Figure 6:
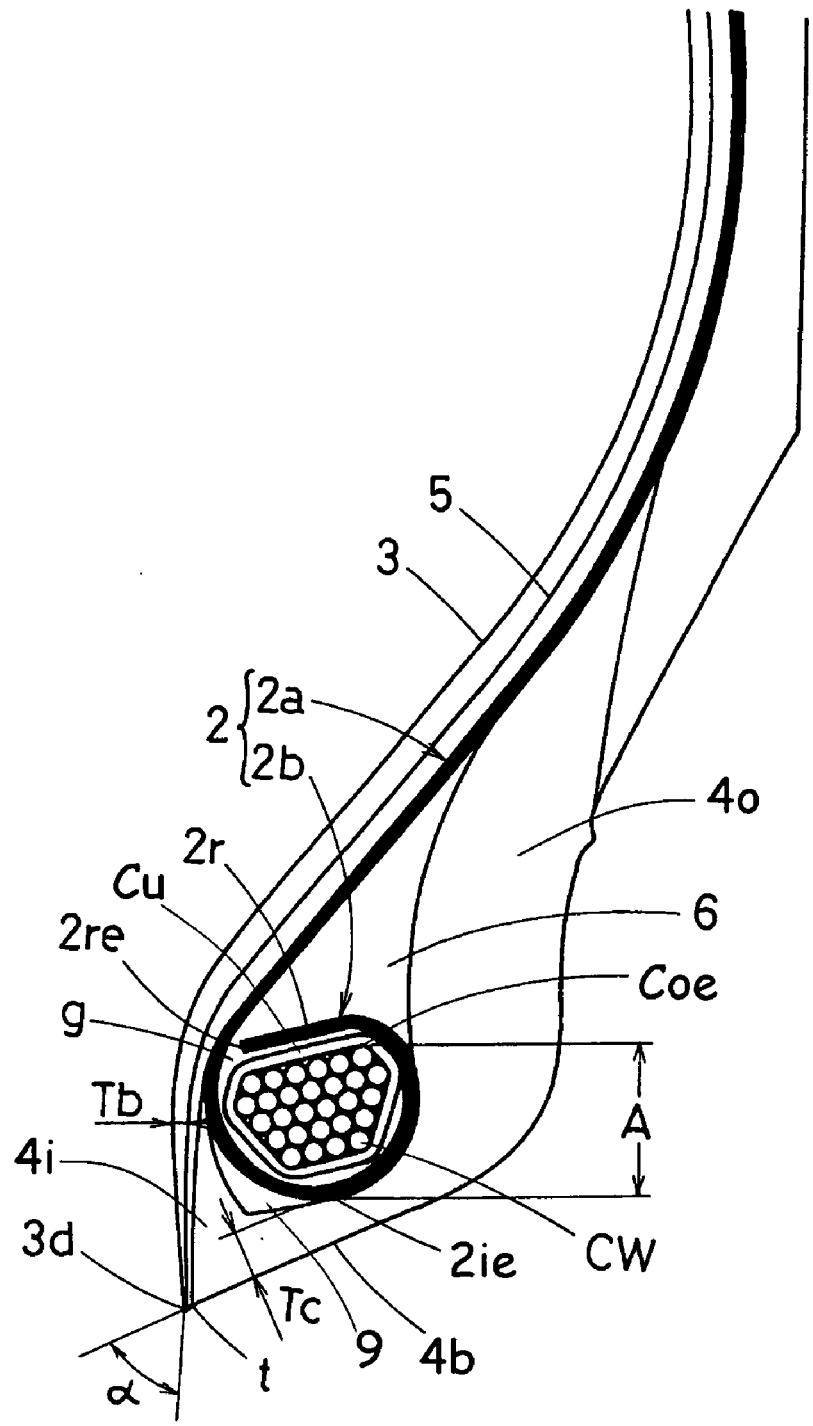
Figure 7:
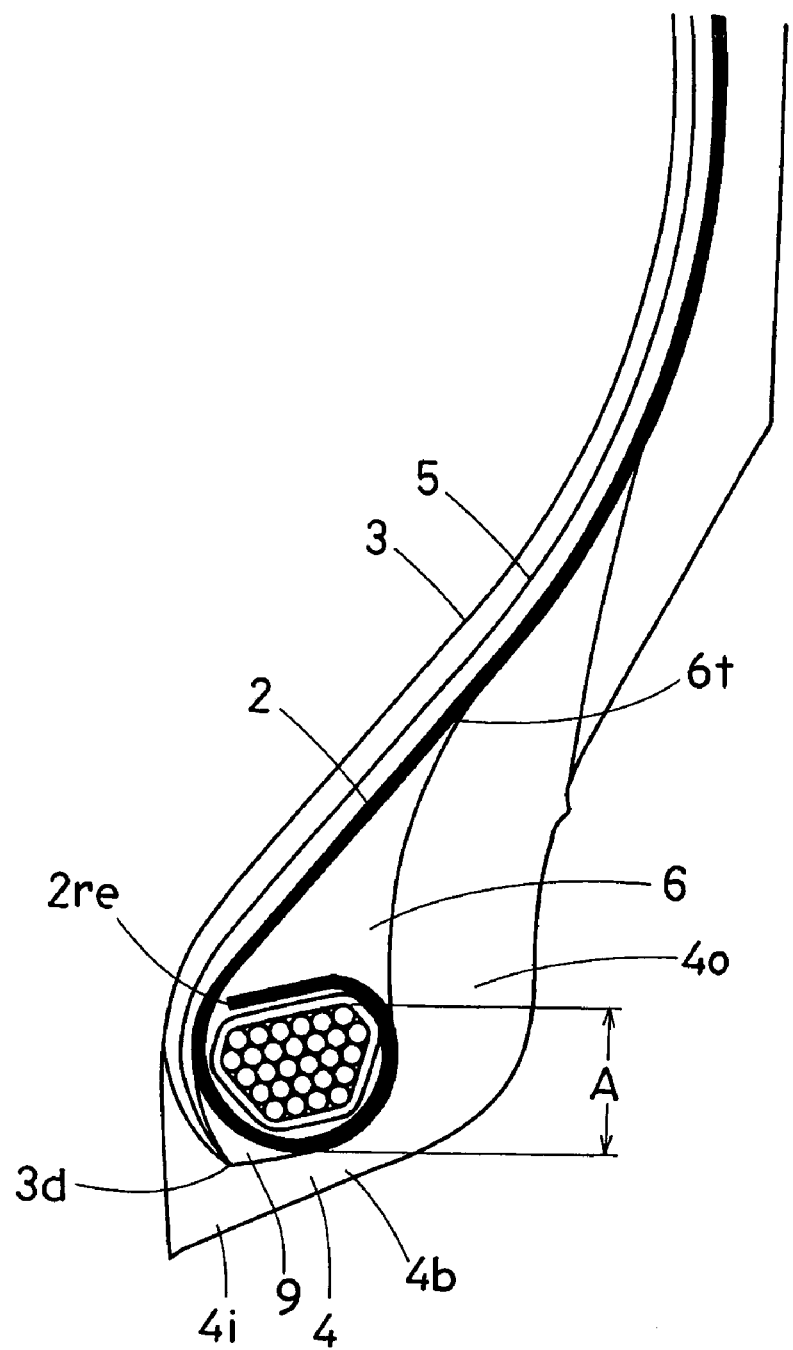
Figure 8:
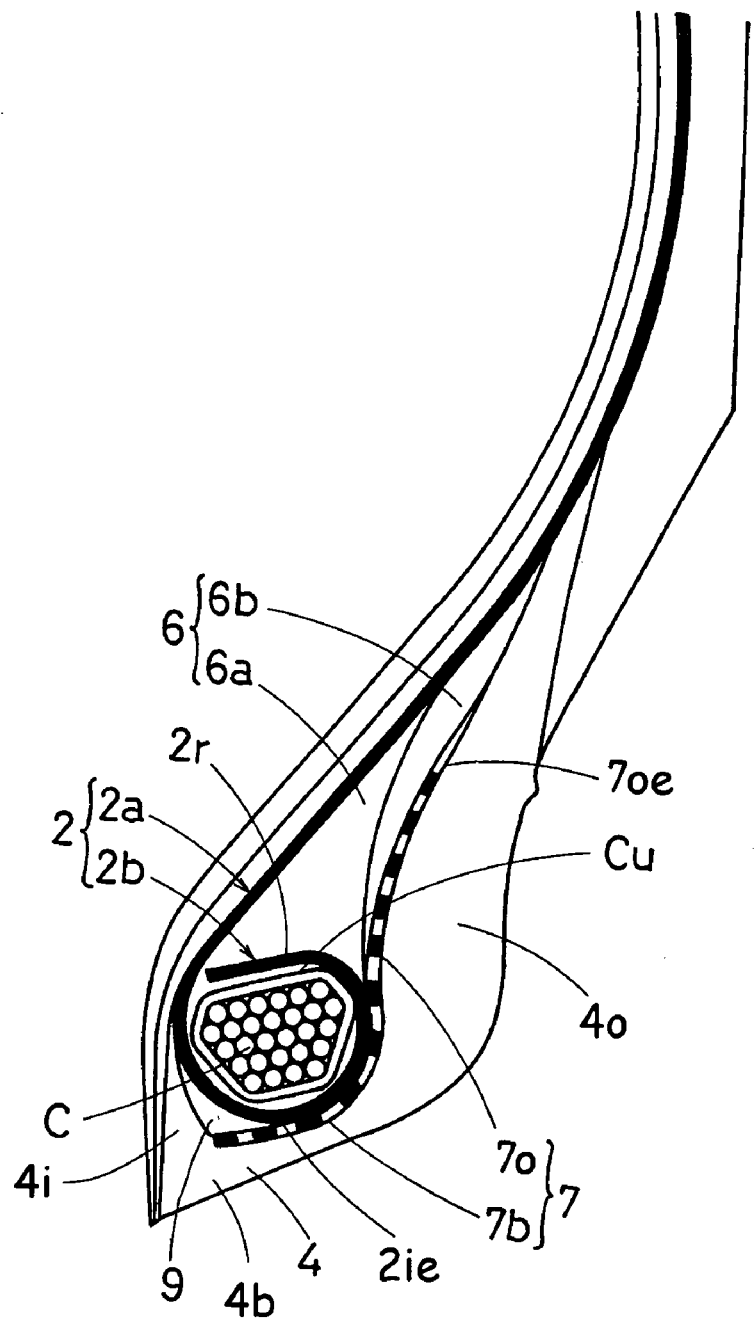
Figure 9:
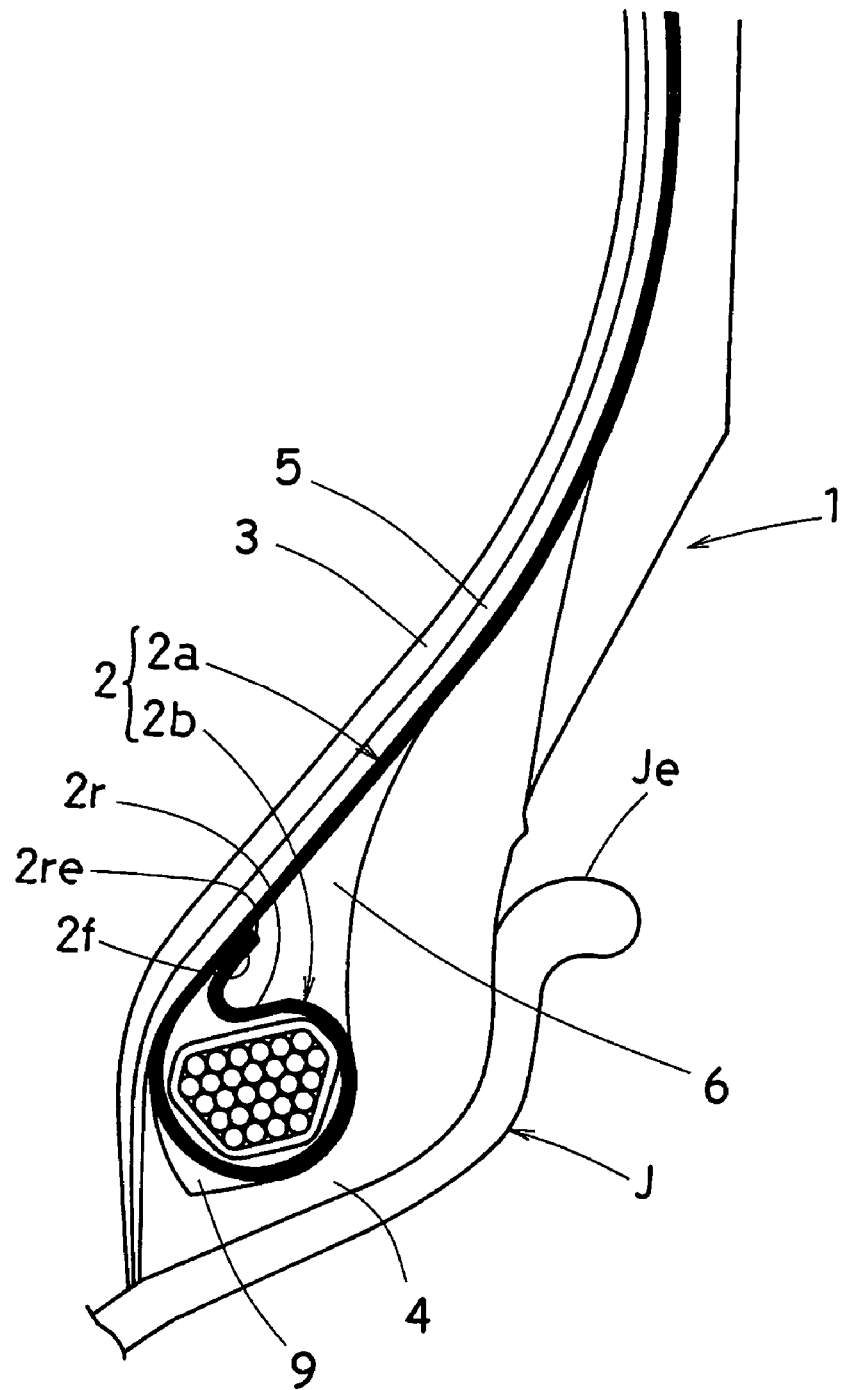

The carcass-ply turnup portion 2b is wound onto the upper surface Cu of the bead core C from the axially outside of the bead core C to have a wound portion 2r which is defined as a portion extending axially inwardly along the upper surface cu. It is preferable that as shown in FIGS. 6–8 the wound portion 2r is terminated before the main portion 2a, or as shown in FIG. 9 the wound portion 2r is bent before the main portion 2a and then terminated after extending parallel with the main portion 2a for a small distance (g) in order to prevent a damage caused by the cut ends of the carcass cords contacting with the cords of the carcass-ply main portion 2a.

When terminated before the main portion 2a, it is preferable that a small distance of about 0.3 to about 2.0 times the cross section diameter of the carcass cord is provided between the end 2re of the winding portion 2r and the carcass cords of the carcass-ply main portion 2a, and the winding end 2re is disposed adjacently to the upper surface cu of the bead core C.

The bead apex 6 in this embodiment is made of a hard rubber having a JIS-A hardness of from 70 to 100 degrees and disposed on the radially outer surface of the wound portion 2r of the carcass ply, so as to secure the wound portion 2r between the bead apex and bead core C. Consequently, the wound portion end 2re is fixed in a place where the strain is smallest, and therefor damages starting from this end may be controlled.

In the above-mentioned region (A), the thickness Tb of the inner liner 3 is set in a range of not less than 0.3 but not more than 4.0 times the cross section diameter of the carcass cord. If less than 0.3 time, the permeating of air and moisture may not be prevented enough, and the effect to prevent the carcass cords from rusting and decreasing in the strength may be decreased. On the other hand, making the thickness more than 4.0 times the diameter will not increase such effect, only to increase the tire cost.

Like the above embodiments, the chafer 4 comprises the base portion 4b extending from the bead toe (t) to the bead heel (h) along the bottom surface of the bead portion 1, and the axially outer portion 4o extending radially outwardly from the bead heel (h) along the outer surface of the tire. The outside portion 4o extends along the carcass 2 and bead apex 6 beyond the upper end 6t of the bead apex 6.

Sixth Embodiment

FIG. 6 shows a sixth embodiment of the present invention.

The inner liner 3 is extended to the bead toe (t) along the tire inner surface, and the insulation 5 is also extended to the bead toe (t). The inner liner 3 and insulation 5 decrease their thicknesses in the course from the region (A) towards the bead toe (t), and the thicknesses become substantially zero at the position of bead toe (t).

The chafer 4 in this embodiment has the axially inner portion 4i which is extended radially outwardly from a position near the bead toe (t) along the axially outer surface of the insulation 5 while decreasing the thickness, and terminated within the region (A).

Seventh Embodiment

FIG. 7 shows a seventh embodiment of the present invention.

The chafer 4 in this embodiment has the axially inner portion 4i which is extended radially outwardly from a position near the bead toe (t) along the tire inner surface while decreasing the thickness, and terminated in the region (A).

The inner liner 3 and insulation 5 extend along the axially outside of the axially inner portion 4i of the chafer 4, and their radially inner end 3d is disposed at a position that is on the radially inside of the above-mentioned region (A), at a distance of more than the above-mentioned minimum rubber thickness Tc of the chafer 4 from the bottom of the bead portion 1, and this position is such that they have no substantial thickness at the position at which the above-mentioned minimum rubber thickness Tc occurs on the chafer 4.

Eighth Embodiment

Eighth embodiment of the present invention shown in FIG. 8 is a modification of the sixth embodiment, in which the bead apex 6 is formed with two hard and soft rubber layers, and the reinforcing layer 7 is added.

This bead apex 6 consists of the inner apex 6a and the outer apex 6b. The inner apex 6a is made of a hard rubber having a JIS A hardness of from 80 to 100 degrees and extends radially outwardly from the above-mentioned wound portion 2r of the carcass 2 while gradually decreasing its thickness. The outer apex 6b is made of a soft rubber having a JIS A hardness of from to 60 degrees and extends along the axially outer surface of the inner apex 6a from a starting point on this axially outer surface positioned substantially at the height of the upper surface Cu of the bead core to a position above the upper end of the axially outer surface to terminate thereat.

The reinforcing layer 7 comprises the base portion 7b radially inside the bead core C, and the axially outer portion 7o which extends upward from the base portion 7b on the axially outside of the bead core C. The radially outer portion 7o is separated from the carcass 2 at or near the axially outermost end of the carcass turnup portion 2b and then extends contacting with the bead apex 6. The upper end 7oe thereof terminates at a position on the radially outer surface of the outer bead apex 6b being lower than the upper end of the inner apex 6a.

The base portion 7b is separated from the carcass 2 at or near the radially innermost end 2ie of the carcass 2, and extends parallel with the bottom surface of the bead portion.

Between these two separating points, the reinforcing layer 7 abuts on the carcass (the lower part of the turnup portion 2b). Between the carcass 2 and the separated part of the base portion 7b, there is disposed a pillow rubber 9 having a hardness of the same level as or harder than the chafer 4.

The axially inner surface of the pillow rubber 9 contacts with the inner portion 4i of the chafer 4.

The entire area of the outer surface of the reinforcing layer 7 contacts with the chafer 4.

The reinforcing layer 7 in this embodiment is made up of a single rubberized ply of parallel steel cords. As to the cord angle thereof, when the tire is viewed sideways facing the sidewall portion normally thereto, the cords in the axially inner portion 7i and axially outer portion 7o are inclined at an angle of from 15 to 45 degrees with respect to a radially outward line.

With this construction as explained the above, the outer apex 6b controls the concentration of strain at the upper end 7oe of the reinforcing layer 7 made of metal cords, and prevents the generation of a large searing force which may cause when the reinforcing layer contacts with the hard bead apex, and thereby the bead durability is improved.

Ninth Embodiment

Ninth embodiment of the present invention shown in FIG. 9 is a modification of the sixth embodiment, in which the wound portion 2r of the carcass is bent before the main portion 2a and extended for a small distance in parallel with the main portion 2a and then terminated.

In this embodiment, an axially inner end part of the wound portion 2r is bent toward the radially outside, forming a bent part 2f extending along the axially outer surface of the main portion 2a. The bent part 2f is secured between the main portion 2a and the above-mentioned bead apex 6, and as the result, the carcass 2 is secured more surely. The radially outer end 2re of the bent part 2f is preferably located radially inwards of the radially outer end Je of the rim flange of the rim J in order to prevent a damage starting from the outer end 2re.

Comparison Test 1

The test tires (tire size: 11R22.5, wheel-rim size: 8.25× 22.5) having the bead structures shown in FIG. 1B and FIG. 2 were prepared, and the following water-injection durability test, durability test, and toe chip test were carried out.

Test results are shown in Tables 1A, 1B, 1 C, and 1D.

In the Tables, *1 represents that the radially inner end 3d of the inner liner is located within the region (A) and inward of the radial center of this region, *2 represents that the radially inner end 3d is located within the region (A) and outward of the radial center of this region, and *3 represents that the radially inner end 3d is located radially outward of the radially outermost point of the bead core. The value of Tb/D shows the minimum value in the region (A).

Water-Injection Durability Test:

Using an indoor drum tester, the test tire was run under an accelerated condition, a tire load of 9000 kg (88.26 KN), tire pressure of 1000 kPa and travel-speed of 20 km/h, while injecting 200 cc water in the tire every 2000 km until the target complete running distances of 10000 km, to obtain the travel distance until damage in the appearance or until the tire became impossible to run. In the tables, the travel distances are expressed by an index based on the target complete running distance of 10000 km being 100.

Durability Test:

Using the indoor drum tester, the test tire was run under an accelerated condition, a tire load of 9000 kg (88.26 KN), tire pressure of 1000 kPa and travel-speed of 20 km/h to obtain the travel distance until damage in the appearance or until the tire became impossible to run. In the tables, the travel distances are expressed by an index based on the target complete running distance of 10000 km being 100.

Toe Chip Test:

After repeating the tire mounting ten times without applying lubricant to neither the tire bead portions nor the bead seats of the rim, the chafer rubber was checked for chip. In the tables, the degree of the chipping damage is indicated by an index which is 100 for no damage.

Comparison Test 2

The test tires (tire size: 11R22.5, wheel-rim size: 8.25× 22.5) having the bead structures shown in FIGS. 3, 4 and 5 were prepared, and the following bead durability tests were carried out.

Bead Durability Test:

Using the indoor drum tester, the test tire was run under an accelerated condition, a tire load of 58.52 KN, tire pressure of 800 kPa and travel-speed of 20 km/h to obtain the driving time until damage in the appearance or until the tire became impossible to run. The test results are shown in Table 2.

Comparison Test 3

The test tires (tire size: 11R22.5, wheel-rim size: 8.25× 22.5) having the bead structures shown in FIGS. 6–9 were prepared, and the above-mentioned water-injection durability test, durability test, toe chip test were carried out. The test results are shown in Tables 3A and 3B.

TABLE 1A

| | Tire | | | | | | | |
|---|---|---|---|---|---|---|---|---|
| | E1a | E2a | E3a | E4a | E5a | E6a | E7a | E8a |
| Bead Structure | FIG. 1B | | | | | | | |
| Carcass | Steel Cord, 1 Ply, (Cord Structure: 3 × 0.2 + 7 × 0.23, Cord Count: 38/5 cm) | | | | | | | |
| Carcass Cord Diameter (D) | 0.89 mm | | | | | | | |

TABLE 1A-continued

| | Tire | | | | | | | |
|---|---|---|---|---|---|---|---|---|
| | E1a | E2a | E3a | E4a | E5a | E6a | E7a | E8a |
| Reinforcing Layer | Steel Cord, 1 Ply | | | | | | | |
| Butyl Content in Inner Liner (%) | 100 | | | | | | | |
| Tb/D | 0.3 | 0.4 | 0.4 | 0.4 | 0.4 | 0.4 | 0.4 | 0.4 |
| Tc/D | 0.6 | 0.6 | 0.8 | 0.3 | 0.3 | 0.3 | 0.3 | 0.3 |
| Toe Angle α (degree) | 63 | 63 | 63 | 63 | 38 | 50 | 50 | 35 |
| 100% Modulus (M100) of Chafer Rubber | 56 | 56 | 56 | 56 | 56 | 56 | 46 | 83 |
| Toe Chip Test | 100 | 100 | 100 | 100 | 95 | 100 | 100 | 70 |
| Durability Test | 100 | 100 | 100 | 125 | 125 | 125 | 100 | 110 |
| Water-Injection Durability Test | 100 | 115 | 100 | 125 | 125 | 125 | 100 | 120 |

TABLE 1B

| | Tire | | | | | | | | | | |
|---|---|---|---|---|---|---|---|---|---|---|---|
| | R1a | R2a | R3a | R4a | R5a | R6a | R7a | R8a | R9a | R10a | C1a |
| Bead Structure | FIG. 1B | | | | | | | | | | |
| Carcass | Steel Cord, 1 Ply, (Cord Structure: 3 × 0.2 + 7 × 0.23, Cord Count: 38/5 cm) | | | | | | | | | | |
| Carcass Cord Diameter (D) | 0.89 mm | | | | | | | | | | |
| Reinforcing Layer | Steel Cord, 1 Ply | | | | | | | | | | |
| Butyl Content in Inner Liner (%) | 100 | | | | | | | | | 50 | 100 |
| Tb/D | 0(*1) | 0(*1) | 0(*1) | 0(*1) | 0(*2) | 0(*3) | 0(*1) | 0(*1) | 0(*1) | 0(*1) | 0(*2) |
| Tc/D | 0.6 | 0.6 | 0.6 | 0.1 | 0.3 | 0.3 | 0.3 | 0.3 | 0.3 | 0.3 | 0.3 |
| Toe Angle α (degrees) | 63 | 63 | 63 | 63 | 63 | 63 | 37 | 63 | 63 | 63 | 35 |
| 100% Modulus (M100) of Chafer Rubber | 56 | 56 | 56 | 56 | 56 | 56 | 56 | 44 | 85 | 56 | 56 |
| Toe Chip Test | 100 | 100 | 100 | 100 | 100 | 100 | 55 | 100 | 65 | 100 | 50 |
| Durability Test | 100 | 100 | 70 | 50 | 100 | 100 | 100 | 70 | 90 | 100 | 85 |
| Water-Injection Durability Test | 84 | 125 | 75 | 50 | 60 | 70 | 100 | 70 | 90 | 95 | 70 |

TABLE 1C

| | Tire | | | | | | | |
|---|---|---|---|---|---|---|---|---|
| | E9a | E10a | E11a | E12a | E13a | E14a | E15a | E16a |
| Bead Structure | FIG. 2 | | | | | | | |
| Carcass | Steel Cord, 1 Ply, (Cord Structure: 3 × 0.2 + 7 × 0.23, Cord Count: 38/5 cm) | | | | | | | |
| Carcass Cord Diameter (D) | 0.89 mm | | | | | | | |
| Butyl Content in Inner Liner (%) | 100 | | | | | | | |
| Tb/D | 0.3 | 0.4 | 0.4 | 0.4 | 0.4 | 0.4 | 0.4 | 0.4 |
| Tc/D | 0.6 | 0.6 | 0.8 | 0.3 | 0.3 | 0.3 | 0.3 | 0.3 |
| Toe Angle α (degrees) | 65 | 65 | 65 | 65 | 38 | 45 | 45 | 45 |
| 100% Modulus (M100) of Chafer Rubber | 56 | 56 | 56 | 56 | 56 | 56 | 46 | 83 |
| Toe Chip Test | 100 | 100 | 100 | 100 | 95 | 100 | 100 | 70 |
| Durability Test | 100 | 100 | 100 | 130 | 130 | 130 | 100 | 120 |
| Water-Injection Durability Test | 100 | 120 | 100 | 130 | 130 | 130 | 100 | 120 |

TABLE 1D

| | Tire | | | | | | | | | | |
|---|---|---|---|---|---|---|---|---|---|---|---|
| | R11a | R12a | R13a | R14a | R15a | R16a | R17a | R18a | R9a | R10a | C2a |
| Tire Size | 11R20.5 | | | | | | | | | | |
| Bead Structure | FIG. 2 | | | | | | | | | | |
| Carcass | Steel Cord, 1 Ply, (Cord Structure: 3 × 0.2 + 7 × 0.23, Cord Count: 38.5 cm) | | | | | | | | | | |
| Carcass Cord Diameter (D) | 0.89 mm | | | | | | | | | | |
| Butyl Content in Inner Liner (%) | 100 | | | | | | | | | 50 | 100 |
| Tb/D | 0(*1) | 0(*1) | 0(*1) | 0(*1) | 0(*2) | 0(*3) | 0(*1) | 0(*1) | 0(*1) | 0(*1) | 0(*2) |
| Tc/D | 0.6 | 0.6 | 0.6 | 0.1 | 0.3 | 0.3 | 0.3 | 0.3 | 0.3 | 0.3 | 0.6 |
| Toe Angle α (degrees) | 65 | 65 | 65 | 65 | 65 | 65 | 37 | 65 | 65 | 65 | 37 |
| 100% Modulus (M100) of Chafer Rubber | 56 | 56 | 56 | 56 | 56 | 56 | 56 | 44 | 85 | 56 | 56 |
| Toe Chip Test | 100 | 100 | 100 | 100 | 100 | 100 | 60 | 100 | 65 | 100 | 50 |
| Durability Test | 100 | 100 | 70 | 50 | 100 | 80 | 80 | 70 | 90 | 100 | 83 |
| Water-Injection Durability Test | 85 | 120 | 60 | 50 | 60 | 80 | 100 | 70 | 90 | 95 | 60 |

TABLE 2

| | Tire | | | | | | | |
|---|---|---|---|---|---|---|---|---|
| | E1b | E2b | E3b | E4b | E5b | R1b | R2b | C1b |
| Bead Structure | FIG. 3 | FIG. 4 | FIG. 5 | FIG. 5 | FIG. 5 | FIG. 5 | FIG. 5 | |
| Carcass | Steel Cord, 1 Ply, (Cord Structure: 3 × 1.2 + 7 × 1.25, Cord Count: 38/5 cm) | | | | | | | |
| T (mm) | 1.0 | 1.0 | 1.0 | 1.0 | 1.0 | 1.3 | 1.5 | 0 |
| m (mm) | 3 | 3 | 3 | 3 | 3 | 3 | 3 | 3 |
| 2nd Inslation | Not Provided | Not Provided | Provided Composition (a) | Provided Composition(b) | Provided Composition(b) | Provided Composition(a) | Provided Composition(a) | Not Provided |
| Ti (mm) | | | 1.5 | 1.5 | 1.5 | | 1.5 | |
| Bead Durability Test Results ※ | 450 Hr | 400 Hr | 600 Hr | 600 Hr | 100 Hr Base Crack | 150 HrCBU | 600 Hr | 350 Hr |

TABLE 3A

| | Tire | | | | | | | |
|---|---|---|---|---|---|---|---|---|
| | E1c | E2c | E3c | E4c | E5c | E6c | E7c | E8c |
| Bead Structure | FIG. 6 | | | | | | | |
| Carcass | Steel Cord, 1 Ply, (Cord Structure: 3 × 1.2 + 7 × 1.25, Cord Count: 38/5 cm) | | | | | | | |
| Carcass Cord Diameter (D) | 1.89 mm | | | | | | | |
| Butyl Content in Inner Liner (%) | 100 | | | | | | | |
| Tb/D | 1.3~1.4 | 1.4~1.8 | 1.4~1.8 | 1.4~1.8 | 1.4~1.8 | 1.4~1.8 | 1.4~1.8 | 1.4~1.8 |
| Tc/D | 1.6 | 1.6 | 1.8 | 1.3 | 1.3 | 1.3 | 1.3 | 1.3 |
| Toe Angle α (degrees) | 63 | 63 | 63 | 63 | 38 | 50 | 50 | 35 |
| 100% Modulus (M100) of Chafer Rubber | 540 | 540 | 540 | 540 | 540 | 540 | 46 | 83 |
| Toe Chip Test | 100 | 100 | 100 | 100 | 95 | 100 | 100 | 70 |
| Durability Test | 100 | 100 | 95 | 125 | 125 | 125 | 100 | 110 |
| Water-Injection Durability Test | 100 | 115 | 100 | 125 | 125 | 125 | 100 | 100 |

TABLE 3B

| | Tire | | | | | | | |
|---|---|---|---|---|---|---|---|---|
| | E9c | E10c | E11c | R1c | R2c | R3c | R4c | R5c |
| Bead Structure | FIG. 7 | FIG. 8 | FIG. 9 | FIG. 6 | | | | |
| Carcass | Steel Cord, 1 Ply, (Cord Structure: 3 × 1.2 + 7 × 1.25, Cord Count: 38/5 cm) | | | | | | | |
| Carcass Cord Diameter (D) | 1.89 mm | | | | | | | |
| Reinforcing Layer | Not Provided | Steel Cord 1 Ply | Not Provided | | | Not Provided | | |
| Butyl Content in Inner Liner (%) | 100 | | | | | | | |
| Tb/D | 1.3~1.4 | 1.3~1.4 | 1.3~1.4 | 0~0 | 0~1.3 | 1.1~1.5 | 1.4~1.8 | 1.4~1.8 |
| Tc/D | 1.6 | 1.6 | 1.6 | 1.6 | 1.6 | 1.3 | 1.3 | 1.3 |
| Toe Angle α (degrees) | 63 | 63 | 63 | 63 | 63 | 50 | 50 | 35 |
| 100% Modulus (M100) of Chafer Rubber | 540 | 540 | 540 | 540 | 540 | 540 | 46 | 83 |
| Toe Chip Test | 115 | 115 | 100 | 100 | 100 | 100 | 100 | 70 |
| Durability Test | 100 | 130 | 100 | 90 | 100 | 100 | 100 | 110 |
| Water-Injection Durability Test | 100 | 115 | 100 | 50 | 70 | 85 | 100 | 120 |

In the pneumatic tires according to the present invention, as apparent from the test results, an air leak into the bead portion occurring in the axially inside area of the bead core is effectively prevented to prevent the damage on the carcass cords caused by moisture in the air, and thereby, the durability of the bead portion may be improved.

INDUSTRIAL APPLICABILITY

The present invention can be suitably applied to heavy-duty pneumatic tires in which steel cords are used for the carcass and/or reinforcing layer, but it is also applicable to light truck tires, passenger car radial-ply tires and the like.

The invention claimed is:

1. A pneumatic tire comprising
   a tread portion,
   a pair of sidewall portions,
   a pair of bead portions,
   a bead core disposed in each said bead portion,
   a carcass comprising a ply of cords extending between the bead portions through the tread portion and sidewall portions and turned up around the bead core in each said bead portion from the axially inside to the axially outside of the tire to form a pair of turnup portions and a main portion therebetween and an inner liner made of an air-impermeable rubber extending on the tire cavity side of the carcass from one of the bead portions to the other, the radially inner end of the inner liner located radially inside the radially innermost end of the carcass, and in a radial region defined between the radially innermost end of the carcass and the radially outermost end of the bead core, the thickness of the inner liner being not less than 0.15 times but not more than 4.0 times the cross section diameter of the carcass cord, wherein each said carcass ply turnup portion is wound substantially once around the bead core to have a wound portion extending axially inwardly along the radially outer surface of the bead core, the wound portion being terminated before the carcass ply main portion, and a bead apex made of a hard rubber having a JIS-A hardness of from 70 to 100 degrees is disposed on the radially outside of said wound portion so as to secure the wound portion between the bead apex and bead core.

2. A pneumatic tire according to claim 1, characterized in that the bead portion is provided with a chafer made of a rubber having a 100% modulus (M100) of from 440 to 830 N/sq.cm disposed along the bottom surface and axially outer surface of the bead portion, and a minimum rubber thickness of the chafer, which is defined as the shortest distance from the bottom surface of the bead portion to cords of an adjacent cord layer, is not less than 1.7 times but not more than 6.0 times the cross section diameter of the carcass cord.

3. A pneumatic tire according to claim 1, characterized in that, in the bead portion, an intersecting angle α between the bead bottom surface and the tire inner surface at a bead toe (t) is set to be not less than 38 degrees but not more than 90 degrees.

4. A pneumatic tire according to claim 1, characterized in that the radially inner end of the inner liner is located in a region defined between two radial lines, a radial line passing through the middle point in the axial direction between the axially innermost point and axially outermost point of the bead core, and a radial line passing through the axially innermost point of the bead core, and a thickness of the inner liner is in a range of from 0.5 to 2.0 mm along a straight line extending through the axially innermost point and axially outermost point of the bead core.

5. A pneumatic tire according to claim 4, characterized in that the bead portion is provided along the bottom surface, axially outer surface and axially inner surface thereof with a chafer made of a rubber having a 100% modulus (M100) of from 440 to 830 N/sq.cm, and the radial distance between the radially outermost point of the bead core and the radially outer end of a portion of the chafer which portion extends upward along the axially inner surface of the bead portion, is not more than 5 mm.

6. A pneumatic tire according to claim 1, characterized in that the bead portion is provided at least on the axially inside of the bead core with an insulation, the insulation is disposed between the inner liner and a rubber layer including a layer of topping rubber for cords adjacent to the insulation and made of a rubber having an excellent adhesive property with the rubber layer and inner liner.

7. A pneumatic tire according to claim 1, characterized in that the bead portion is provided with a chafer made of a rubber having a 100% modulus (M100) of from 440 to 830 N/sq.cm disposed along the bottom surface and axially outer surface of the bead portion, and a minimum rubber thickness of the chafer, which is defined as the shortest distance from the bottom surface of the bead portion to cords of an adjacent cord layer, is not less than 1.7 times but not more than 6.0 times the cross section diameter of the carcass cord, and in the bead portion, an intersecting angle a between the bead bottom surface and the tire inner surface at a bead toe (t) is set to be not less than 38 degrees but not more than 90 degrees.

8. A pneumatic tire according to any one of claims 1–6 and 7, characterized in that a distance of the end of the wound portion from the carcass cords in the carcass ply main portion is in a range of from 0.3 to 2.0 times the diameter of the carcass cords.

9. A pneumatic tire according to claim 1, characterized in that the cross-sectional shape of the bead core (C) is a hexagon approximate to an inverse triangle whose maximum width occurs on the radially outside of the center thereof.

* * * * *